June 30, 1964  W. J. DOBBINS  3,138,952
EXTENSOMETER DEVICE

Filed Nov. 4, 1960  2 Sheets—Sheet 2

INVENTOR.
Walter James Dobbins
BY Robert P. Auber
George W. Reiber
ATTORNEYS

United States Patent Office 3,138,952
Patented June 30, 1964

3,138,952
EXTENSOMETER DEVICE
Walter James Dobbins, Hawthorn Woods, Lake Zurich, Ill., assignor to American Can Company, New York, N.Y., a corporation of New Jersey
Filed Nov. 4, 1960, Ser. No. 67,328
2 Claims. (Cl. 73—89)

The present invention relates to an extensometer device for use with materials testing machines, and more particularly to an extensometer which magnifies and records the changes in length of a specimen under test without the need for clamping or otherwise attaching the extensometer to the test specimen itself.

In testing materials to determine load-elongation characteristics, the elongation of the test specimen due to the applied loads is generally very small and requires sensitive apparatus with a high magnification ratio to obtain an accurate measurement. In measuring the elongation by the conventional extensometers presently in use, the device is generally not supported externally but is clamped to and held by the test specimen itself so that two sharp gage points, which may be conical or knife-edged, are securely in contact with the surface of the test specimen and spaced apart a predetermined distance termed the gage length. In some types of extensometers the change in gage length as the load is applied to the test specimen is mechanically magnified and indicated on a dial, with the operator being required to read and manually record simultaneous values of applied load and elongation in gage length. Obviously this method is slow and subject to human error. With other types of extensometer gages, electrical or other means are used whereby load-elongation diagrams are drawn directly as a trace or curve on a chart. These auto-graphic devices are generally quite expensive due to the precision and complexity of the apparatus required.

Under some circumstances the method of attachment of the extensometer to the test specimen may have a very appreciable effect on the results of the test. The clamping pressure must be sufficient to support the instrument, which, particularly with the autographic type, may be quite heavy, and to preclude slippage of the gage points along the surface of the specimen during the test. Since the clamping pressure is exerted over a small area, the intensity of the resulting lateral stress may produce areas of high total stress at the points of attachment while the stress in the remainder of the gage length is far less. This condition causes the test specimen to have a greater deformation than the applied load would normally produce so that the load-elongation graph is greatly distorted. Furthermore, if the instrument is such as to require shallow center punch holes in the test specimen to engage the gage points or is secured by set screws having hardened points which penetrate into the surface of the test specimen, surface discontinuities will result. Such a condition will produce high local stress concentrations with effects which are additive to the disturbances noted above.

While the error-producing effects noted above may be within acceptable limits in some cases, for example in tests of large diameter steel specimens, considerable difficulty is experienced in using the conventional extensometers to obtain load-elongation characteristics of soft or thin materials such as aluminum alloys and steel foils. This difficulty stems from the fact that the sharp points or knife-edges of the gage, when clamped against the specimen with sufficient force to support the instrument and also preclude slippage, tend to nick or scratch the surface of the specimen. These scratches produce stress concentrations which may have a considerable effect and produce erroneous results and may often initiate premature rupture of the test specimen thereby invalidating the test. Premature rupturing of the test specimen also presents the danger of injury to the extensometer; in fact many such instruments must ordinarily be removed from the test specimen before rupture to preclude the possibility of damage to the gage points or to the delicate mechanism of the instrument.

Extensometers which must be clamped to the test specimen have additional disadvantages in that the set-up time to prepare for a test may be considerable due to the careful clamping operations required. This is particularly so with soft or thin materials in view of the extreme care which must be used in attaching the extensometer to the test specimen in order to minimize the possibility of scratching or nicking the surface. Furthermore, conventional extensometers having gage length clamps generally have a limited range of operation and are susceptible to injury when extended beyond their limited range which makes them unadaptable for testing non-metallic materials, or cemented or soldered joints in which the elongation before rupture may be quite large, or conversely, in which the point of rupture is difficult to predict and may occur at very low load conditions.

An object of the present invention therefore is to provide an extensometer which will overcome the problems hereinbefore pointed out.

Another object is to provide such an extensometer which will measure the deformation of the test specimen due to the applied loads without the need for being attached, clamped or otherwise supported by the test specimen.

Another object is to provide such an extensometer which is especially suited for tensile testing of soft or thin metal specimens.

Another object is to provide such as extensometer which is comparatively simple and inexpensively constructed but which will give accurate and reliable results.

Another object is to provide such an extensometer which can be easily and rapidly operated.

A further object is to provide such an extensometer which is adapted to accurately measure the deformation in the test specimen up to and through the point of rupture.

Yet a further object is to provide such an extensometer in which the danger of injury to the extensometer through premature rupture of the test specimen is eliminated.

Still a further object is to provide such an extensometer which is adapted for recording the values of elongation and applied load simultaneously as a continuous trace on the same chart.

Numerous other objects and advantages of the invention will be apparent as it is better understood from the following description, which, taken in connection with the accompanying drawings, discloses a preferred embodiment thereof.

The above objects are accomplished in the present invention by providing a conventional testing machine with a rack and pinion in meshing engagement and mounted to the upper and lower test crossheads respectively. The crossheads each have gripping jaws to secure the test specimen therebetween. As the testing machine applies an axial load to the test specimen, the crossheads move linearly relative to each other an amount equal to the deformation produced in the test specimen. This linear movement is translated into an equivalent rotary movement of the pinion due to the action of the rack meshing therewith. The rotary movement of the pinion is magnified by a rack and gearing system which system rotates the recording drum of a recording apparatus by a magnified amount directly proportional to the deformation of the test specimen under the applied axial load.

Referring to the drawings.

Figure 1:
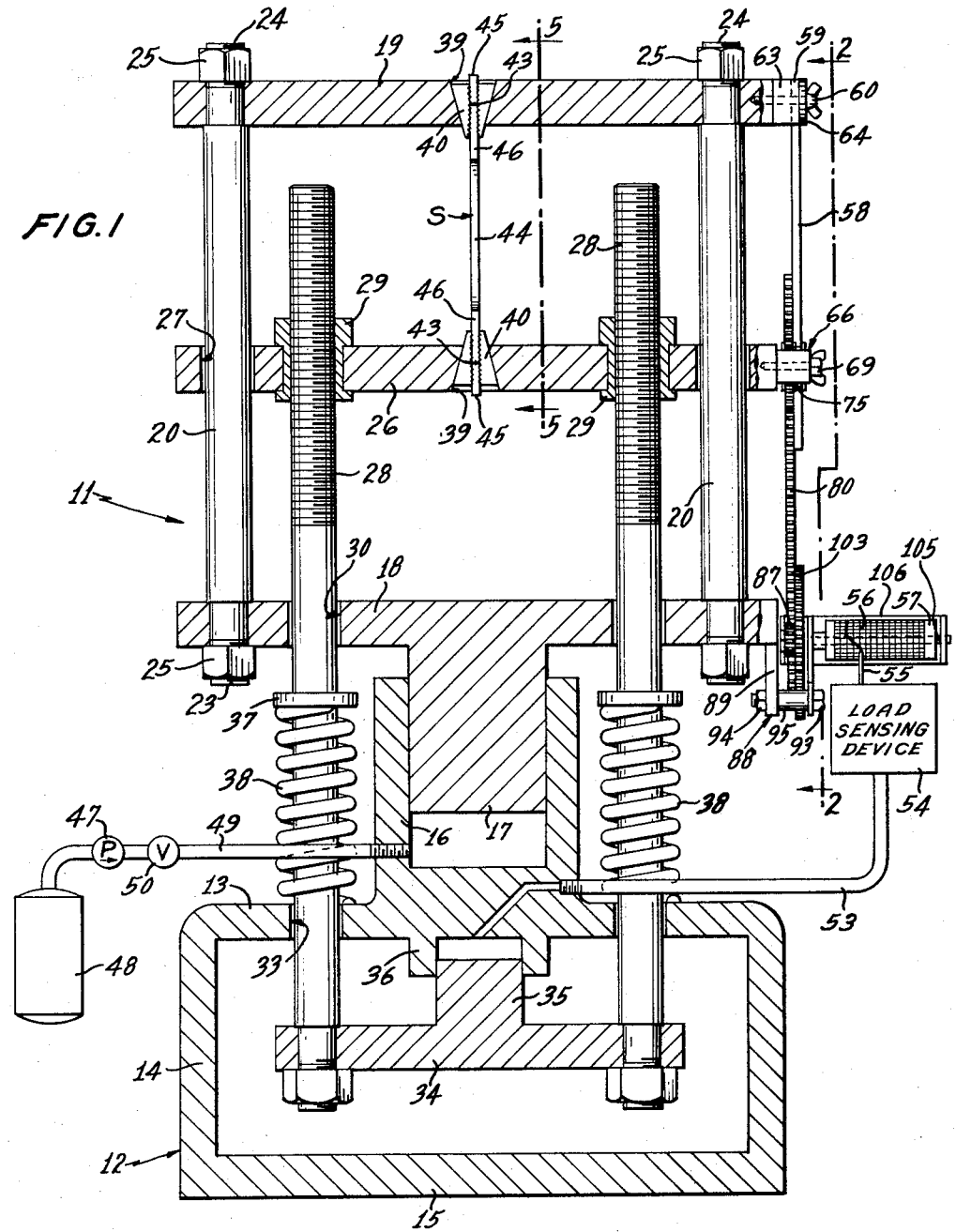
FIGURE 1 is a front elevational view partly in section and partly in schematic form of a tensile testing machine with an extensometer device embodying the features of the present invention.

In the preferred or exemplary embodiment of the instant invention illustrated in FIG. 1, the extensometer device is shown as being used on a hydraulically operated testing machine generally designated 11. It should be understood, however, that the subject extensometer can be used with any of the conventional types of testing machines such as are used to determine stress-strain characteristics of materials. The testing machine 11 comprises a hollow base 12 having a horizontal platform 13 supported by a vertical wall 14 mounted on a floor plate 15. Integral with the upper surface of the platform 13 is a hydraulic cylinder 16 within which a piston 17 is slidably disposed for movement in the vertical direction. A horizontal table 18 mounted on the upper end of the piston 17 is rigidly secured to an upper crosshead 19 by means of vertical pillars 20 which have threaded ends 23 and 24 extending through the table and upper crosshead respectively and are fastened thereto by nuts 25.

Disposed between the table 18 and upper crosshead 19 is a lower crosshead 26 having a clearance holes 27 for the passage of the pillars 20 therethrough. The lower crosshead 26 is supported by vertical screw columns 28 which engage threaded bushings 29 rotatably mounted in the lower crosshead. The bushings 29 are interconnected by gearing or other suitable means (not shown) so as to be incapable of rotation except in unison. Rotation of the threaded bushings 29 on the screw columns 28 raises or lowers the lower crosshead 26 relative to the upper crosshead 19 so as to accommodate specimens for test having various lengths. The means for rotating the threaded bushings 29 may be manually actuated or power driven and inasmuch as the mechanisms used are well known in the art and form no part of the present invention, no detailed description is deemed necessary here.

The screw columns 28 extend downwardly through openings 30 in the table 18 and openings 33 in the platform 13 with the lower ends of the columns being rigidly secured to a horizontal scale member 34 disposed within the hollow base 12. Attached to the upper surface of the scale member 34 is a piston 35 slidably disposed within a cylindrical pressure capsule 36 formed in the lower surface of the platform 13.

Integral with the screw columns 28 are flanges 37 positioned intermediate the platform 13 and table 18. The flanges 37 rest on springs 38 disposed on the columns 28 between the flanges 37 and platform 13. The springs 38 support the weight of the rigid structure comprising the lower crosshead 26, screw columns 28, bushings 29, scale member 34 and piston 35 while permitting this structure to have the necessary freedom of movement in the vertical direction.

Figure 5:
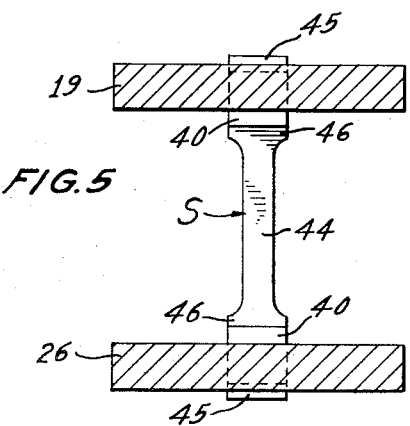
FIG. 5 is a sectional view taken substantially along line 5—5 of FIG. 1.

Extending through the upper and lower crossheads 19 and 26 respectively are vertically aligned wedge-shaped holes 39 each having a pair of wedge-shaped grips 40 disposed therein. Each wedge grip 40 has a vertically disposed flat knurled surface 43, with the knurled surfaces of each pair of grips facing each other to provide means for securely holding a flat test specimen S therebetween. As shown in FIG. 5, the test specimen S is cut from thin sheet metal material and has a test section 44 of predetermined length and width, and widened end sections 45. Each end section 45 extends between and is held by a pair of wedge grips 40 so as to position the test section between the upper crosshead 19 and a lower crosshead 26 for testing in tension. Due to the shape of the wedge grips 40 and the hole 39 in which they seat, the force with which the grips hold the end sections 45 increases as the tensile load on the specimen is increased thereby precluding slippage of the specimen in the grips during a test. A portion 46 of each widened end section 45 protrudes from the wedge grips 40 above and below the test section 44. For reasons which are set forth hereinafter, it is desirable to minimize the lengths of the protruding portions 46 as much as possible.

In making a test, a pump 47 supplies pressurized hydraulic fluid from a reservoir 48 through a hydraulic line 49 to the hydraulic cylinder 16 resulting in an upward force on the piston 17. Due to the integral connection between the piston 17 and upper crosshead 19 through the table 18 and pillars 20, a tensile load is applied to the test specimen S. A control valve 50 located in the line 49 between the pump 47 and cylinder 16 controls the rate of flow of fluid into the cylinder and hence the rate of load application to the test specimen S.

As the tensile load is applied to the test specimen S, the lower crosshead 26 is pulled upwardly by the specimen with a force equal to the tensile load, which force is exerted by the piston 35 on the hydraulic fluid in the pressure capsule 36. Thus the pressure of the fluid within the capsule 36 is directly proportional to the tensile load being applied to the test specimen S. This pressure is transmitted through a tube 53 to a load sensing device 54 which may be any of the types used on testing machines and are well known in the art. The sensing device 54 actuates a writing member 55 which bears on a paper chart 56 mounted on the surface of a recorder drum 57 and is described more fully hereinafter.

Under the applied tensile load, the test specimen S is stretched whereupon the upper crosshead 19 and an attached vertically disposed rack 58 move upwardly relative to the lower crosshead 26 by an amount equal to the elongation of the test specimen. The upper end 59 of the rack 58 is secured to the upper crosshead 19 by means of a stud 60, which stud engages a threaded hole in the crosshead 19 and clamps the rack between a spacer block 63 and a washer 64 both being disposed on the stud.

Figure 2:
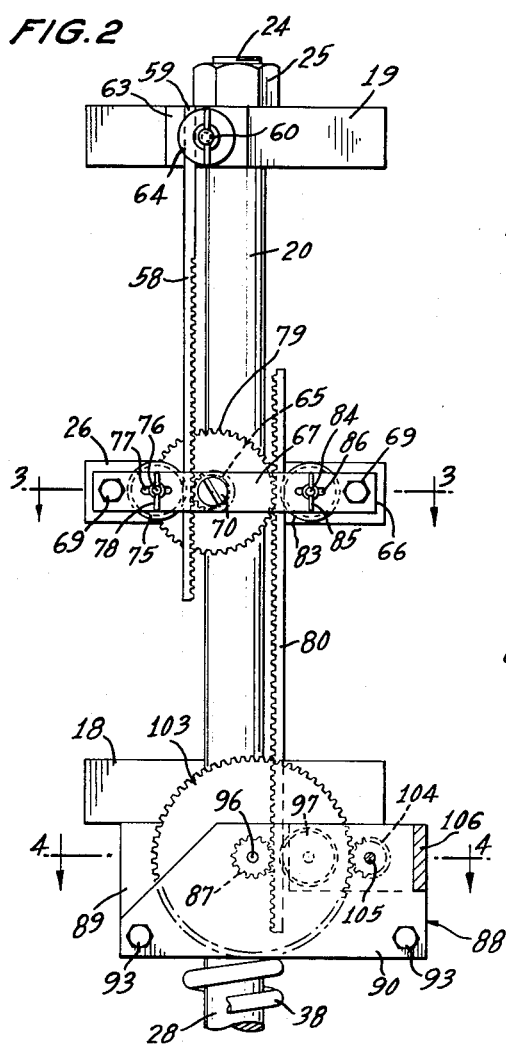
FIG. 2 is an enlarged partial side view taken substantially along line 2—2 of FIG. 1.
Figure 3:
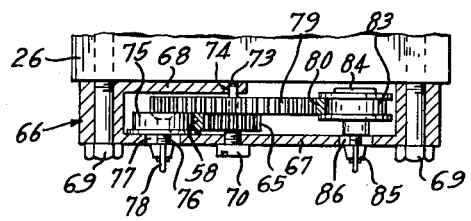
FIG. 3 is a sectional view taken substantially along line 3—3 of FIG. 2.
Figure 4:
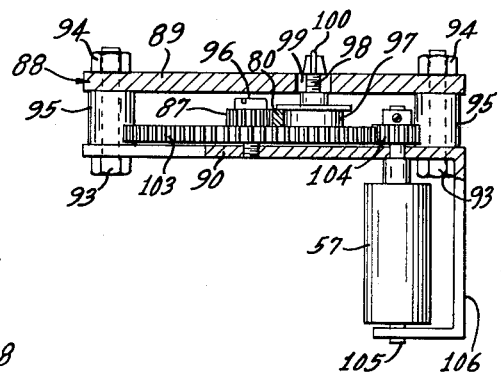
FIG. 4 is a sectional view taken substantially along line 4—4 of FIG. 2.

The upward movement of the rack 58 imparts to a pinion 65 a clockwise (as shown in FIG. 2) angular displacement by virtue of the meshing of the rack 58 adjacent its lower end with the pinion 65, which angular displacement is directly proportional to the change in length of the test specimen S. The pinion 65 is rotatably mounted on a bracket 66 which has an outer member 67 and an inner member 68 and is secured to the lower crosshead 26 by screws 69 (FIG. 3). The pinion 65 rotates on a shaft consisting of a stud 70 threadably engaged to the outer member 67 and having an end 73 which extends into a hole 74 in the inner member 68 for additional support.

A roller 75 bears against the back surface of the rack 58 to maintain the rack in proper meshing engagement with the pinion 65. The roller 75 is adjustably mounted to the outer member 67 by means of a stud 76 which stud has a threaded end extending through an elongated slot 77 in the outer member and is secured thereto by a wing-nut 78. The slot 77 permits the position of the roller 75 to be adjusted relative to the pinion 65 so that the rack 58 meshes with the pinion with a minimum of friction and substantially no backlash.

A gear 79 is coaxially secured to the pinion 65 by suitable means (not shown) so that both rotate in unison on the stud 70. The gear 79, having the same clockwise angular displacement as the pinion 65 but a greater pitch diameter moves a vertically disposed rack 80 with which it is enmeshed downwardly relative to the lower crosshead 26 by an amount proportional to but greater than the elongation of the test specimen S. A roller 83 bearing against the back surface of the rack 80 keeps it in proper meshing engagement with the gear 79. The roller 83 is adjustably mounted to the outer member 67 of the bracket 66 by means of a stud 84 and wing-nut 85, the threaded end of the stud passing through an elongated slot 86 in the outer member to permit the position of the roller 83 to be adjusted relative to the gear 79.

The downward movement of the rack 80 imparts a clockwise (as shown in FIG. 2) angular displacement to a pinion 87. The pinion 87 is rotatably mounted on a bracket 88 secured to the table 18 and meshes with the rack 80 adjacent the lower end of the rack. Since the table 18 also moves upwardly relative to the lower crosshead 26 by an amount equal to the elongation of the test specimen S, the rack 80 causes the pinion 87 to be angularly displaced or rotated an amount proportional to the elongation of the test specimen and magnified by the combined effects of the relative movement between the table and lower crosshead and the linear displacement relative to the lower crosshead imparted to the rack 80 by the gear 79.

The bracket 88 has an inner plate 89 which is attached to the table 18 and an outer plate 90 secured by screws 93 and nuts 94 to the inner plate with spacers 95 disposed on the screws between the inner and outer plates. The pinion 87 rotates on a stud 96 threadably engaged to the outer plate 90. A roller 97 is mounted on a stud 98 having a threaded end which extends through an elongated slot 99 in the inner plate 89 and is secured thereto by a wing-nut 100. The roller 97 bears against the back surface of the rack 80 to maintain the rack in proper meshing engagement with the pinion 87, the slot 99 permitting the roller 97 to be moved relative to the pinion 87 to achieve this result.

The angular displacement of the pinion 87 is imparted to a gear 103, the gear being coaxially mounted with the pinion on the stud 96 and being secured to the pinion by suitable means (not shown) so that both rotate in unison. The gear 103 rotates a pinion 104 with which it is meshed imparting to the pinion 104 an even greater angular displacement by virtue of the difference in pitch diameters. The pinion 104 rotates the recorder drum 57, both being rigidly mounted on a shaft 105. The shaft is rotatably mounted in a U-shaped support structure formed by the outer plate 90 of the bracket 88 and a drum support member 106 integral with and extending outwardly from the outer plate.

The recorder drum 57 is angularly displaced or rotated in direct proportion to the elongation of the test specimen S produced by the applied loads but by amounts which are greatly magnified, the magnification being predetermined by the relative pitch diameters of the pinions and gears used. Simultaneously, the writing member 55 is translated by the sensing device 54 along one dimension of the chart 56 in the direction of the axis of the recorder drum 57 by amounts directly proportional to the pressure within the capsule 36 and hence to the load being applied to the test specimen S. Consequently, the writing member 55 automatically produces a continuous trace on the chart 56 of elongation versus applied load for the specimen being tested.

Comprehensive tests using the subject extensometer have shown that it gives an accurate and reliable load-elongation trace of a tensile test with the results being within the acceptable limits of accuracy for tests of this type as compared to similar results using a conventional electronic extensometer. A disadvantage where precise evaluation of the load-elongation characteristics is required is that the frictional drag of the gear system must be considered in correcting for zero load. However, this drag is very small and is constant, and its value can generally easily be determined by a direct reading from the load dial of the testing machine.

Also, a small error is introduced using the subject extensometer due to the slight deformation which occurs during the test in the widened end portions 46 of the test specimen S which protrude from the wedge grips 40 above and below the test section 44 (see FIG. 5). However, the stress in the protruding end portions 46 is much lower due to the greater cross-sectional area than the stress in the test section 44, so that the deformation of the end portions per unit length as compared to the deformation per unit length of the test section is much less. Since the length of the test section 44 is proportionally much greater than the combined lengths of the protruding end portions 46, the error introduced because of the end portions can generally be disregarded. Furthermore, since the stress in the test section 44 is much greater than that in the protruding end portions 46, there is no effect on the yield point determination.

On the other hand, the subject device has many advantages over the conventional extensometers presently in use. It permits easier and faster testing since there is no necessity for mounting or securing the extensometer to the test piece itself preliminary to each test. Load-elongation characteristics may be obtained for any metal specimen without invalidating the results. By comparison, conventional extensometers such as the electronic type are generally limited to the harder metals because with soft metals, the gage length clamps tend to scratch the surface of the test specimen thereby initiating premature fractures. This becomes especially critical with such materials as aluminum sheet and steel foils, for the testing of which the subject extensometer is therefore especially suited.

The subject extensometer is comparatively simply and ruggedly constructed and has a high range of operation. These features make it desirable for testing materials having a high degree of elasticity or whose point of rupture is difficult to predict since the extensometer is not susceptible to injury due to extension beyond a limited range or due to premature rupture of the test specimen.

Also, because no gage length clamps are required the subject device is well adapted for measuring the elongation of cemented or soldered joints under load. Furthermore, as will be readily apparent to those skilled in the art, the subject extensometer is equally suitable for use in making tests of materials under compressive loads. In making a compression test, the test specimen is positioned between the table 18 and lower crosshead 26 of the testing machine 11. The pressurized fluid supplied by the pump 47 to the hydraulic cylinder 16 exerts an upward force on the piston 17 and table 18 thereby compressing the specimen between the table and the lower crosshead 26. The specimen pushes the lower crosshead 26 upwardly with a force equal to the compressive load and this force is transmitted to the piston 35 and thence to the load sensing device 54 which actuates the writing member 55 as heretofore described. Under the applied compressive load, the length of the test specimen is decreased whereupon the table 18 moves upwardly relative to the lower crosshead 26 by an amount equal to the change in length of the test specimen. Due to the integral connection therebetween, the upper crosshead 19 and attached rack 58 move upwardly with the table 18. The upward movement of the rack 58 rotates the recorder drum 57 in direct proportion to the change in length of the test specimen in the same manner as has been described. Thus the writing member 55 automatically produces a continuous trace on the chart 56 of reduction in length versus applied compressive load for the specimen being tested.

It is thought that the invention and many of its attendant advantages will be understood from the foregoing description and it will be apparent that various changes may be made in the form, construction, and arrangement of the parts without departing from the spirit and scope of the invention or sacrificing all of its mate-

I claim:

1. An apparatus for recording load versus elongation characteristics of a test specimen secured between upper and lower crossheads of a tensile testing machine comprising, a first pinion and first gear rotatably mounted on the lower crosshead and adapted to rotate in unison about a common axis, a first rack secured to the upper crosshead and meshing with said first pinion, means for maintaining said first rack in meshing engagement with said first pinion, said first rack providing a rigid connection between said upper crosshead and said first pinion whereby the linear displacement of said lower crosshead relative to said upper crosshead is positively converted into an exact equivalent angular displacement of said first pinion and said first gear, a frame member having a fixed relationship to said upper crosshead and disposed below said lower crosshead, a second pinion and second gear rotatably mounted on said frame member and adapted to rotate in unison about a common axis, a second rack meshing with said first gear and second pinion, means for maintaining said second rack in meshing engagement with said first gear and with said second pinion, said second rack providing a rigid connection between said first gear and said second pinion whereby the combined linear displacement of said lower crosshead relative to said frame member and the linear displacement of said second rack relative to said lower crosshead imparted to said second rack by the angular displacement of said first gear are positively converted into an exact equivalent angular displacement of said second pinion and said second gear, recording means secured to said frame member having a drum with a chart supporting surface and a chart affixed thereto, said drum having an extended shaft, a gear mounted on the end of said shaft and meshing with said second gear thereby causing said drum to be angularly displaced by a magnified amount directly proportional to the elongation of said test specimen, a writing member mounted on said recording means in contact with said chart, and means to move said writing member across said chart in the direction of the drum axis in response and by an amount related to the load applied to the test specimen whereby a continuous trace relating the elongation of the test specimen to the applied load is obtained.

2. The apparatus set forth in claim 1 wherein said means for maintaining said racks in meshing engagement with said pinions and gear comprises a roller mounted adjacent each pinion and gear, said roller being adapted to roll against the surface of the rack remote from said pinion or gear, said roller having adjustable mounting means to permit the center line distance between each roller and the adjacent pinion or gear to be adjusted whereby proper meshing of said racks with said pinions and gear with substantially no backlash and with a minimum of friction is maintained.

References Cited in the file of this patent
UNITED STATES PATENTS

| | | |
|---|---|---|
| 2,030,457 | Lewis | Feb. 11, 1936 |
| 2,164,993 | Lewis | July 4, 1939 |
| 2,445,682 | Macgeorge | July 20, 1948 |
| 2,518,585 | Williams | Aug. 15, 1950 |
| 2,555,633 | Comins | June 5, 1951 |
| 2,600,847 | Church | June 17, 1952 |
| 2,645,016 | Wrobel | July 14, 1953 |
| 2,859,628 | Arko | Nov. 11, 1958 |